(12) United States Patent
Foo et al.

(10) Patent No.: US 8,763,916 B1
(45) Date of Patent: Jul. 1, 2014

(54) ELECTRONIC CARD READABLE BY MAGNETIC CARD READERS

(75) Inventors: Eric Foo, Thousand Oaks, CA (US); Ravi Bemra, West Hills, CA (US)

(73) Assignee: Privasys, Inc., Tibucon, CA (US)

( * ) Notice: Subject to any disclaimer, the term of this patent is extended or adjusted under 35 U.S.C. 154(b) by 107 days.

(21) Appl. No.: 13/471,315

(22) Filed: May 14, 2012

(51) Int. Cl.
*G06K 19/06* (2006.01)
(52) U.S. Cl.
USPC ........................................... 235/492; 235/493
(58) Field of Classification Search
USPC ................................................ 235/492, 493
See application file for complete search history.

(56) References Cited

U.S. PATENT DOCUMENTS

2002/0017568 A1\* 2/2002 Grant et al. .................... 235/491
2011/0278364 A1\* 11/2011 Mullen et al. .................. 235/492

\* cited by examiner

*Primary Examiner* — Allyson Trail
(74) *Attorney, Agent, or Firm* — Roy L. Anderson; Wagner, Anderson & Bright, P.C.

(57) ABSTRACT

An electronic card uses a magnetic stripe communication device in which either a horizontal magnetic field generator or a vertical magnetic field generator is selectively activated on a transaction specific basis as determined by the electronic card to transmit data to a magnetic reader to emulate a magnetic stripe.

15 Claims, 5 Drawing Sheets

ELECTRONIC CARD READABLE BY MAGNETIC CARD READERS

FIELD OF THE INVENTION

The present invention is in the field of electronic cards and, more particularly, in the field of electronic cards that can create transaction-specific magnetic stripe data packet so that it can be read by all magnetic card readers.

BACKGROUND OF THE INVENTION

The United States primarily relies upon static magnetic stripe credit and debit cards that are readable by a magnetic stripe card reader. The US payment cards have no electronics embedded within the card body and no microprocessors. To a limited extent, less than 5% of terminals read contractless cards, which provide magnetic stripe data that is communicated contactlessly using 14443 protocol. Outside the United States, many countries rely upon EMV (Europay Master-Card, Visa) cards using a secure microprocessor in combination with static magnetic stripe data so they are readable by EMV chipt card readers as well as magnetic stripe readers. While EMV standard chip readers provide a higher level of security, the static magnetic stripe cards are Each option has its advantages and disadvantages, and there are many reasons why both cards currently exist.

Since the 1960's debit, credit, charge and payment cards have been inanimate pieces of plastic. Cardholders are identified by a primary account number, expiration date and other cardholder service codes, verification codes and discretionary data, all of which is encorded on the magnetic stripe data packet on the back of the card along with three to four static security number known as CVC 2, CVId2, CVV2, which are adjacent to the signature panel on the back of the card. Cardholders are identified on the front of the card by their name along with an account number viewable on the front of the card, the expiration data of the card and possibly information about the network on which the payment card operates.

The magnetic stripe data contains static cardholder data that can be read by magstripe readers, the terminals used by merchants at the point of sale ("POS"). When a merchant swipes a card, a magnetic head reads the static and then transmits the data to the issuing bank with an authorization request. "Track 1" data on the magstripe typically contains the customer's name, account number, expiration date, and a "discretionary data" field to be used by the issuing bank. "Track 2" data contains the account number, expiration date, and another "discretionary data" field, all of which must fit within approximately 40 digits of space. Until recently, the majority of banks used only Track 2 data for their payment card transactions.

The security issue facing magnetic stripe payment cards. Any individual who obtains the Track 1 and Track 2 account information and the printed security code has all the information that he needs to manufacture a counterfeit card. Once gained whether through security breaches at the terminal level or through skimming devices, the compromised magnetic stripe data can be reused by fraudsters who encode the data on counterfeit plastics. It is estimated that transaction fraud from skimming, data breaches costs the issuing banks (and ultimately the cardholders) many billions of dollars a year.

Outside of the US, payment card fraud is being addressed by EMV (Europay, MasterCard Visa) cards that use a microprocessor readable by EMV chip readers. EMVCo sets the protocols and approval processes for EMV terminals and the EMV microprocessors that are embedded in the EMV chip cards. The EMV cards are more difficult to duplicate than conventional cards due to the security features of the microprocessors.

EMV cards provide many benefits, however when presented at conventional magnetic stripe POS terminal readers, the EMV chip is not used and the conventional static magnetic stripe data packet is read. To achieve the benefits of the EMV cards, it is required that the new EMV chip terminals be installed at the merchant. Accordingly it is only when there is wholesale replacement of the existing POS magnetic stripe terminals that EMV chip cards can deliver the full benefit of fraud prevention. This "re-terminalization" is essential to widespread smart card adoption and is a burdensome expense to merchants who must change both their terminals and their back-end IT infrastructure.

MasterCard and Visa accelerated smart card adoption in Europe, Malaysia, Singapore and other territories through what is known as "liability shift." In the United States, a POS merchant is not liable for loss when a fraudulent card is used in a "card present" transaction, so long as the merchant properly obtains a "personal identification number" ("PIN") or a signature and obtains authorization from the issuing bank. If the issuing bank approves a transaction made with a fraudulent card re-using static magnetic stripe data, the issuing bank absorbs that loss. Conversely, in countries with "liability shifts", the issuing banks is mandated to distribute EMV compliant payment cards, and it is the merchant that bears the fraud loss unless he has invested in an EMV compliant card terminal, even if the merchant accepts a fraudulent card. Shifting the fraud loss to the merchant gives the merchant a strong incentive to invest in the new EMV complaint terminals.

Although MasterCard and Visa have attempted to to introduce EMV cards in the United States, they have not enjoyed success. In considerable part, this is due to the enormous cost of merchant re-terminalization and updates to the IT processing platform, estimated to be in the vicinity of $12-13 billion. Because MasterCard and Visa have been unable to shift the fraud loss to merchants, those merchants lack the economic incentive to invest in EMV terminals and issuers only issue EMV cards for the limited segment of their portfolios that are used outside of the US.

As a result, the American payment card market did not respond to increasing multibillion-dollar fraud payment card transaction through the widespread adoption of EMV cards.

The present invention was created to reduce payment card fraud by ensuring transaction-specific data could be used to authenticate a cardholder through authorization and could be readable by the existing legacy system of magstripe readers and transaction networks. The inventors understand that EMV cards would be adopted slowly if at all in the US, which creates a compelling need to make the legacy system itself more secure.

The present invention enables the magnetic stripe card itself to become the center of innovation. Re-terminalization is unnecessary because data is received from the card in the traditional format. The present invention ensures transaction-specific magnetic stripe data can be read universally by all legacy magnetic stripe terminals. To ensure universal readability by the magnetic stripe terminals, the present invention, It has long been desired to create a single card usable both inside the United States with magnetic stripe readers and outside the United States with smart card readers that offers the advantages of both cards while minimizing the disadvantages of both cards. Such a card not only has the promise of saving billions of dollars a year in fraud, but it also has the promise of opening many other uses for the card, and generating enormous savings related to combining multiple cards into a single card. Yet, to date, it does not exist.

The prior art includes many patents that propose just such a card, but none has yet been commercialized. Given the long felt need for such a card, and the enormity of the problems it could solve, and the attempts by a great many to solve the problems associated with creating such a card, one has to ask why such a card is not yet available. The reasons are many. Cost and manufacturability are two primary reasons why such a card has not yet been commercialized, but there are other reasons as well. The present invention recognizes and solves a problem that has prevented electronic smart cards from providing transaction-specific magnetic stripe data packet which is consistently readable by magnetic stripe card readers.

SUMMARY OF THE INVENTION

The present invention is generally directed to an electronic card in which either a horizontal magnetic field generator or a vertical magnetic field generator can be selectively activated to transmit data to a magnetic reader to emulate a magnetic stripe card function depending upon a magnetic field characteristic of the magnetic reader.

The electronic card has a transmission algorithm residing in a computer-readable medium accessed by a computer (e.g., one or more processors) and the transmission algorithm controls the rate of transmission of data by the magnetic stripe communication device to the magnetic reader.

The horizontal magnetic field generator can be a solenoid coil used when the magnetic reader uses a horizontal field read head such as is created by a c-core ferromagnetic read head and the vertical magnetic field generator can be an orthogonal coil used when the magnetic reader uses a vertical field read head such as is created by a vertically wound read head and both the solenoid coil and the orthogonal coil can be fused together as a single transducer.

A method is provided which detects a characteristic of a magnetic reader during a card transaction between an electronic card and a magnetic reader and then a magnetic stripe card function is emulated by selecting either a horizontal magnetic field generator or a vertical magnetic field generator to emulate a magnetic stripe card function depending upon the characteristic of the magnetic reader. The method can be implemented in a computer system by executing one or more computer program modules configured to communicate with electronic storage media that stores values for a magnetic stripe card function and causing a magnetic stripe communication device to broadcast a magnetic stripe data function that is read by a magnetic reader.

Accordingly, it is a primary object of the present invention to provide a card and method for broadcasting a magnetic stripe data packet from an electronic card so that it is consistently read by magnetic card readers during a swipe of the electronic card while providing transaction-specific information to authenticate the cardholder and provide other value added services.

This and further objects and advantages will be apparent to those skilled in the art in connection with the drawings and the detailed description of the invention set forth below.

BRIEF DESCRIPTION OF THE DRAWINGS

FIG. 3 illustrates a solenoid coil while

FIG. 5 illustrates an orthogonal coil while

DETAILED DESCRIPTION OF THE INVENTION

Traditional transaction cards in the United States, such as debit, charge, credit or gift cards, have a static magnetic stripe that contains information that is read by a magnetic reader. The present invention is concerned with the effective transmission of a transaction-specific data packet from an electronic card to a magnetic reader so that it can be read by the magnetic reader. Rather than including such information in a magnetic stripe, the information is broadcast by a magnetic stripe communication device within the electronic card. Because the data packet is being broadcast, it can be varied so that the content of a data packet for any given transaction is different, enabling transaction-specific magnetic stripe data.

The magnetic stripe communication device of the present invention uses a coil to broadcast magnetic field data which is then read by a magnetic reader during a given transaction which is commonly referred to as a swipe. For example, the card may be "swiped" through a magnetic reader, such as is commonly done at many points of purchase such as stores. However, not all magnetic readers rely upon the action of a hand to "swipe" the card past a magnetic reader; instead, in some machines, such as ATM machines, the card is inserted into the machine and then removed again from the machine.

A magnetic reader has one of two types of magnetic heads—either a read only head or a read/write head, and there are two types of characteristics of such read heads, which will be explained further hereinafter.

Figure 1:
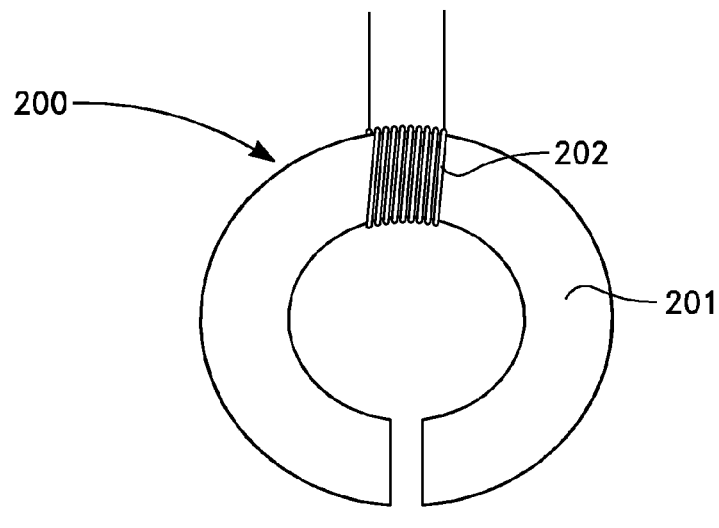
FIG. 1 illustrates a horizontal field read head of a magnetic reader such as is found in a typical read only head of a magnetic reader used in hand-held readers, terminal readers, Dip readers and simplified motorized readers with read only function.

FIG. 1 illustrates a read only head 200, which is typically found in hand-held readers, but which is also found in terminal readers, dip readers and simplified motorized readers. In a read only head 200, coils 202 are wound across a "horseshoe" or C-core ferromagnetic high permeability material 201 as illustrated in FIG. 1.

Figure 2:
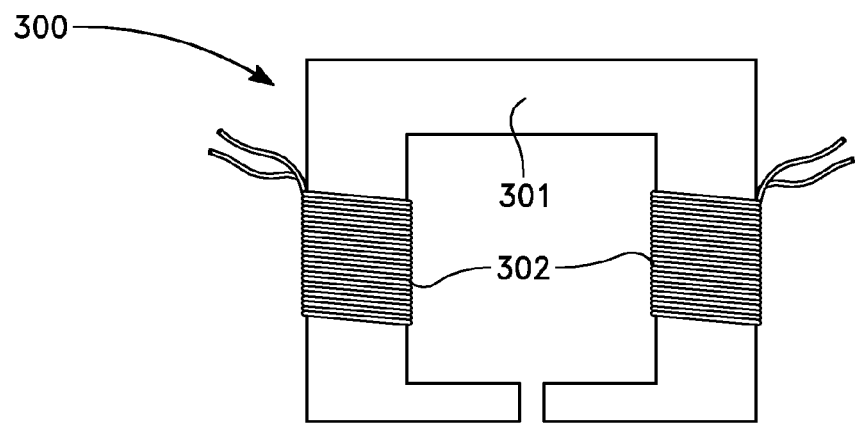
FIG. 2 illustrates a vertical field read head of a magnetic reader such as is found in a read/write head of an ATM reader.

FIG. 2 illustrates a read/write head 300, which is typically found in an ATM reader. In a read/write head 300, Read and Write coils 302 are separately wound vertically around a ferromagnetic high permeability material 301 as illustrated in FIG. 2.

Magnetic readers "read" data from a magnetic stripe by detecting magnetic fields encoded on the static magnetic stripe medium as it passes the head of the magnetic reader.

Magnetic readers "read" data from a magnetic stripe communication device of an electronic card according to the present invention by detecting magnetic fields "broadcast" by a coil of the magnetic stripe communication device as it passes the magnetic head of the magnetic reader.

Figure 3:
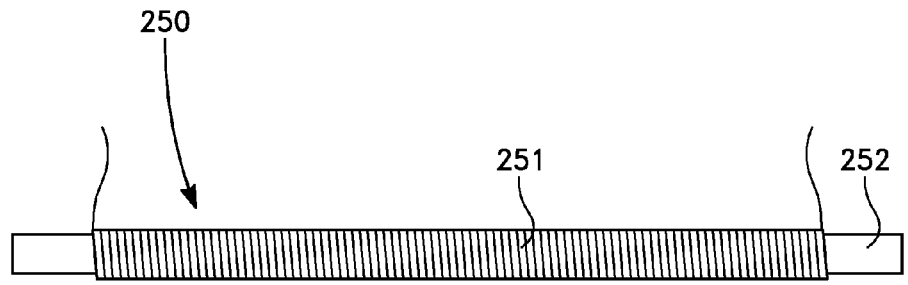
Figure 4:
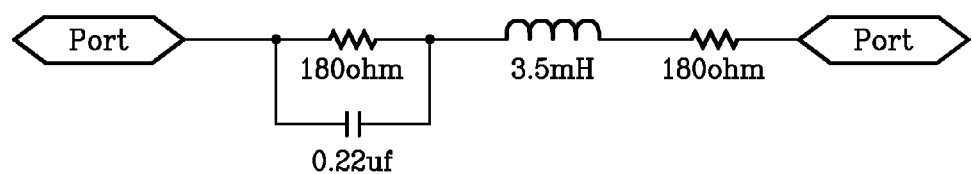
FIG. 4 illustrates a circuit diagram of a solenoid coil drive circuit.

The most common type of read head in widespread use today in the United States, referred to earlier as a read only head, will be referred to hereinafter as a horizontal field read head. The main characteristic of such a read head is that it will "read" a horizontal directed magnetic field generated by a horizontal magnetic field generator. Thus, when a magnetic reader has a read head with a C-core as illustrated in FIG. 1, the magnetic stripe communication device must use a horizontal magnetic field generator to achieve consistent success in completing swipe transactions. The easiest method to do this is to employ a solenoid coil 250, an example of which is illustrated in FIG. 3. By forcing current round the coil 251 wind around a ferromagnetic core 252, a horizontal directed magnetic field will be generated. And thus, the horizontal field read head with its coil wound around horizontally will be able to pick up the signals transmitted from the solenoid coil.

Figure 5:
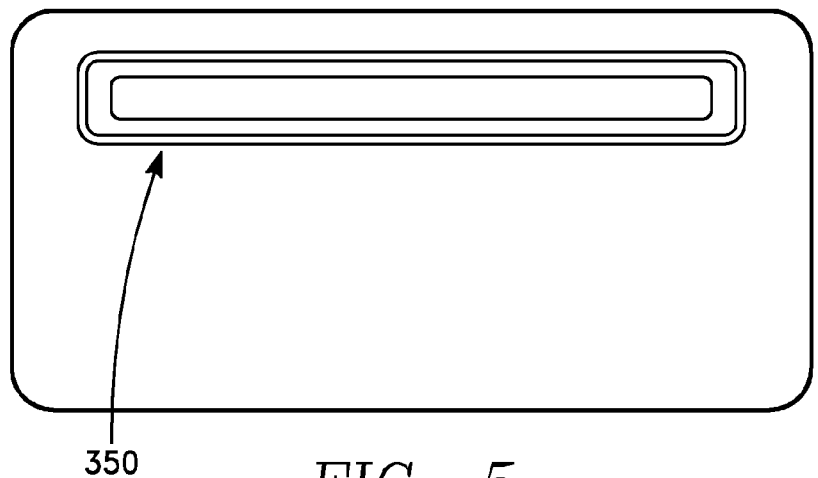
Figure 6:
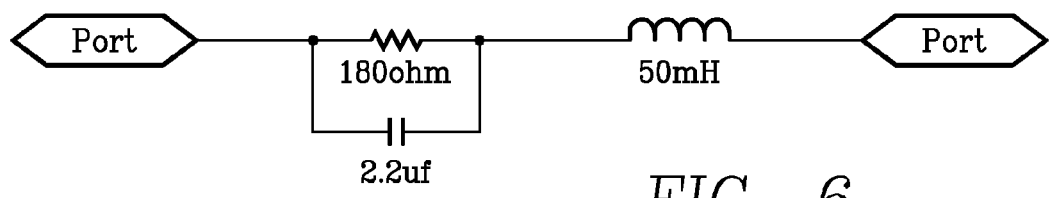
FIG. 6 illustrates a circuit diagram of an orthogonal coil drive circuit.

The second type of read head in widespread use today in the United States will be referred to hereinafter as a vertical field read head. This is the type of read head used in read/write heads such as are used in ATM machines or other terminals that are both reading and writing magnetic stripe data packets such as reward schemes. If a horizontal magnetic field generator is used with a vertical field read head with vertical core windings as illustrated in FIG. 2, there will be a phase shift change of 180 degrees around the center of the coil which will cause a failure in completing a swipe transaction. Thus, a vertical field read head with vertical core windings represents a second and significantly different type of read head from a horizontal field read head. To achieve consistent success in transactions when a magnetic reader has a vertical field read head with vertical core windings as illustrated in FIG. 2, the magnetic stripe communications device must use a vertical magnetic field generator to transmit magnetic field data vertically up as the magnetic read/write head glides across the electronic card of the present invention. With this method, no phase shift of pickup signal is observed, although the transmitting bit rate must be adjusted from that used with a horizontal magnetic field generator. An orthogonal coil 350, an example of which is illustrated in FIG. 5, can be used as a vertical magnetic field generator.

Thus, a magnetic stripe communication device of an electronic card in accordance with the present invention will have and use either a horizontal magnetic field generator or a vertical magnetic field generator depending upon which field generator will be read by the reader head of the magnetic reader in which it is being used. Recognition of the orientation of the reader head on a transaction-specific basis can be sensed by a transmission algorithm of the present invention. It also can also be used to control the rate of transmission of data by the magnetic stripe communication device to the magnetic reader depending upon which orientation of the magnetic field generator is being used.

Figure 7:
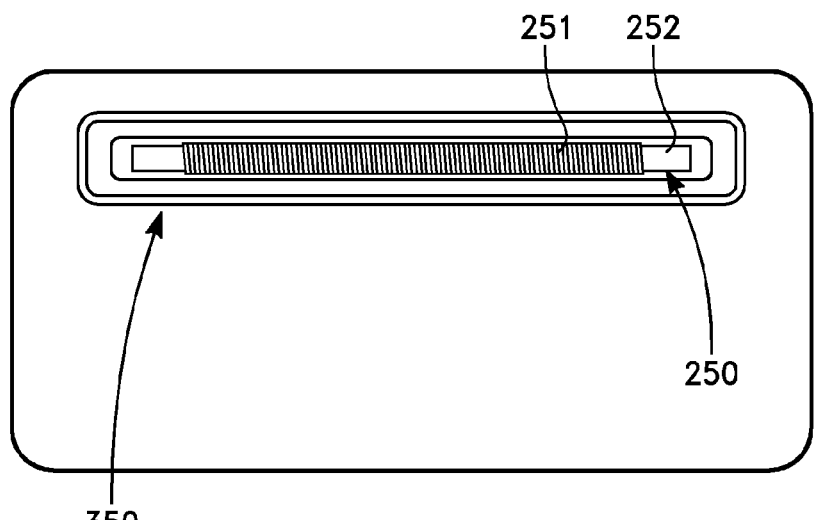
FIG. 7 illustrates a hybrid coil in which a solenoid coil and an orthogonal coil are fused together.

In accordance with an especially preferred embodiment of the present invention a solenoid coil and an orthogonal coil can be fused together in a hybrid coil as a single transducer to transmit magnetic waves. An example of such a hybrid coil is illustrated in FIG. 7. This type of communication device works on individual coil type sensed by an activation algorithm to determine what kind of magnetic read head it is interfacing. There are several methods to fabricate the solenoid and orthogonal coil available in the market, some of which are manual or machine wire wind, trace wind PCB (minimum trace×space=3.5×3.5 mil), trace wind Flex (minimum trace×space=1.5×1.5 mil), and photolithography trace wind Flex (<1 mil for trace×space).

So far the present description has focused on a magnetic stripe communication device used in an electronic card without any description of the rest of the electronic card. The remainder of the present description will describe other aspects of an electronic card suitable for use in accordance with the present invention without discussing the details of the magnetic stripe communication device that have already been discussed.

Figure 8:
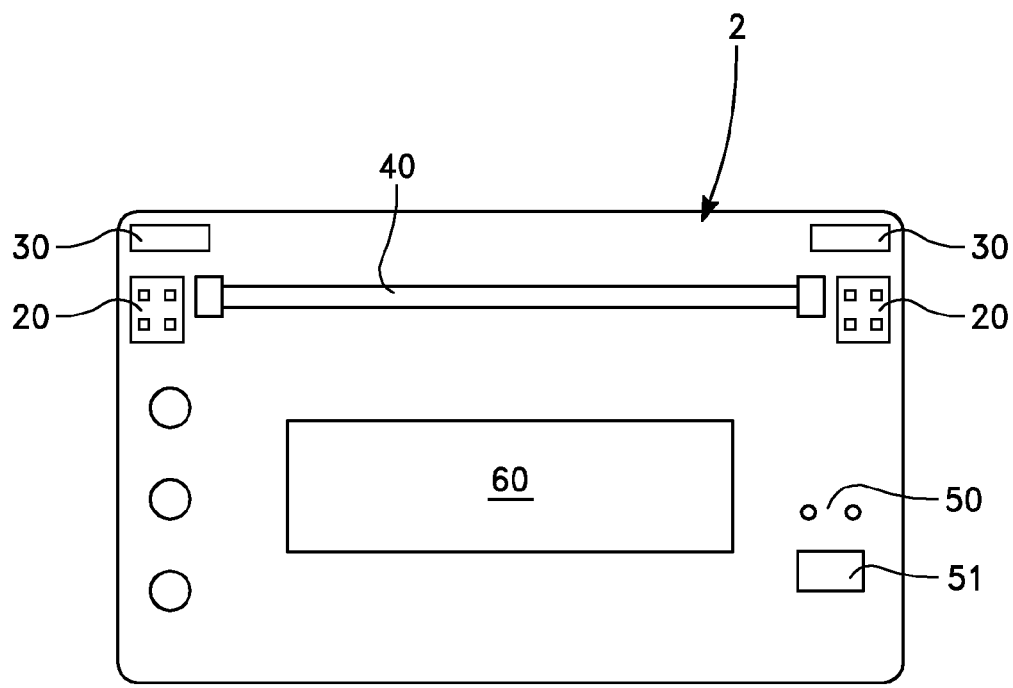
FIG. 8 depicts the back side of an electronic card suitable for use in accordance with the present invention with a back cover removed and certain components shown diagrammatically on a printed circuit board ("PCB").

An electronic card, shown generally as 1 in FIG. 8, has a printed circuit board (PCB) 2 enclosed within a card front cover 5 on a front side 15 and a card back cover 6 on a back side 16 where the front cover & back covers conform to the card design rules required by American Express, China Union Pay, Discover, JCB, MasterCard, Visa or any new payment network. The Card Back side 16 of card 1 is orientated such that it functions similarly to a back side of a conventional credit card having a magnetic stripe on its back side.

Electronic card 1 should be usable in situations where a smart card reader is used and in applications where a card is read by a conventional magnetic stripe reader. Accordingly, electronic card 1 should satisfy the ISO 7816 standard for smart cards, incorporated herein by reference, and the ISO 7810 standard for transaction cards, also incorporated herein by reference. Details relating to both ISO standards and electronics, dimensions and other details needed to meet both standards, is set forth in U.S. Patent Application Publication 20070034700, published Feb. 15, 2007, entitled "Electronic cards and methods for making same," the disclosure of which is specifically incorporated herein by reference and hereinafter referenced as "Electronic Cards."

Electronic card 1 should have two processors or micro controllers for performing secure and non-secure functions as detailed in Electronic Cards. Alternatively, a single processor or micro controller can be used to replace the secure and non-secure processors described in Electronic Cards so long as it has suitable input/output ports and divided memory so that it functions equivalently to the secure and non-secure processors described in Electronic Cards and conforms to the EMV securirty requirements of a secure processor. For purposes of the present invention, it will be presumed that MCU 51 is such a combined processor or a combination of a secure and non-secure processor as described in Electronic Cards.

Processor or micro controller unit 51 (whether it be a single processor or a combination of two processors) is mounted to PCB 2 as are other electronics, generally designated as 50, necessary for electronic card 1 to function.

Figure 10:
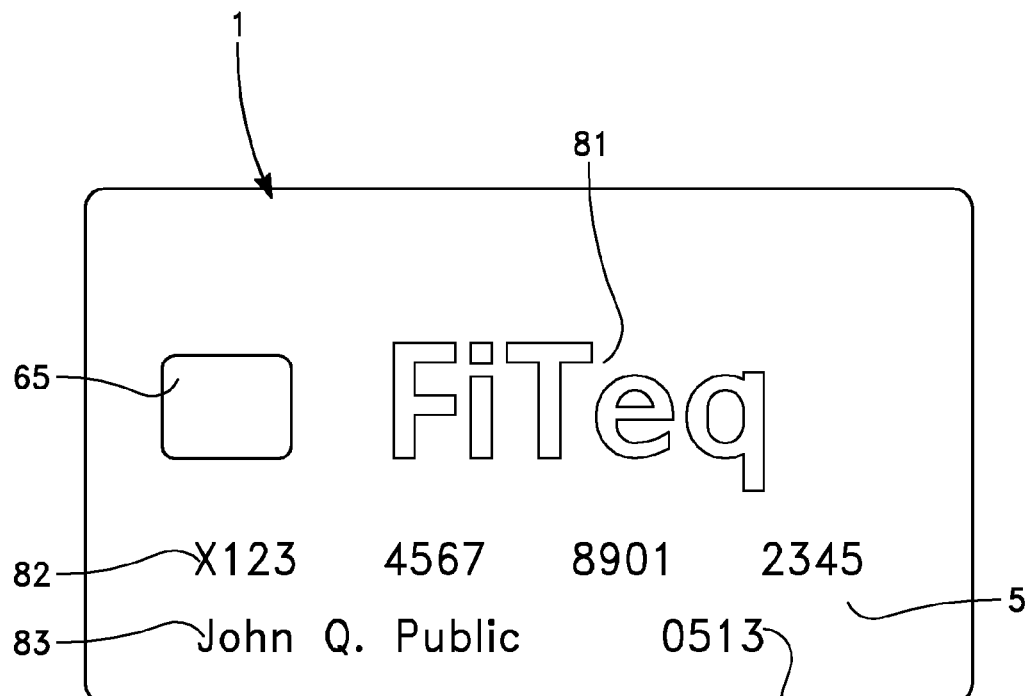
FIG. 10 depicts a front side of an electronic card suitable for use in accordance with the present invention with a front cover in place.

Front side 15 of electronic smart card 1 (see FIG. 10) has a 7816 chip plate 65 and can having branding 81, an embossed primary account number 82, an embossed user name 83 and embossed expiration date 84. Embossed primary account number 82, embossed name 83 and embossed expiration date 84 are located according to the ISO 7816 standard and meet its requirements and the card design requirements of by American Express, China Union Pay, Discover, JCB, MasterCard, Visa or any new payment network.

Back side 16 of electronic card 1 (see FIG. 11) has a signature strip 67 and hologram 66 that satisfy the ISO 7816 standard (like conventional transactions cards). However, unlike conventional transaction cards, electronic smart card 1 has three sensors (61-63) for accessing three different accounts whose account numbers (71-73) and combined expirations dates with CVV (74-76, respectively) are printed on back cover 6. LEDs 77 alongside sensors 61-63 indicate to a user which, if any, of account numbers 71-73 has been selected for use. (Note that in an especially preferred embodiment account number 71 is the same as embossed primary account number 82 and embossed expiration date 83 is contained in expiration date with CVV 74.) Also accessed from back side 16 is an on/off switch 64. A strip of magnetic tape 43 is also located on back cover 6 and positioned so as to prevent cross talk between a reader head that can detect both track 1 and track 2 data from a conventional magnetic stripe. Such positioning is keyed to location of where track 1 and track 2 data would be in conventional magnetic stripe card following ISO standard 7810 and is thus located between where such data would be in such a card. In an alternative embodiment, a flexible display, rather than LEDs, can be used to indicate account selection.

Electronic card 1 of the present invention uses a magnetic stripe communication device shown generally without any details as 40 for broadcasting a broadcast signal during a swipe of the card so that a magnetic stripe reader head can read a magnetic stripe data packet contained in the broadcast signal. The broadcast signal may contain track 1 and/or track 2 data (or, if desired, track 3 data as well).

It has been found that the problem of cross talk (discussed in greater detail in Electronic Cards) can be effectively dealt with by use of a magnetic stripe positioned on back cover 6 as already noted above to shield any bleed over of the magnetic stripe track data onto an adjacent track. This method of dealing with cross talk is much simpler, cheaper to implement and more efficient than broadcasting a cancellation signal to prevent cross talk and represents a significant advance in the prevention of cross talk in an electronic card that broadcasts data to a magnetic stripe reader head.

Attached to PCB 2 oriented toward back side 16 of card 1 are two environment sensors 20 and two speed sensors 30 oriented toward the side ends of card 1 in the proximate area of card 1 where a magnetic stripe is located in a conventional magnetic stripe card according to ISO standard 7810. Two reader environment sensors and speed sensors are included so that electronic card will function when read by a magnetic stripe reader in either a left to right or right to left swipe direction.

Each reader environment sensor 20 is located such that it will be triggered by a magnetic reader head 100 during a swipe of electronic card 1 before the magnetic reader head passes over any portion of magnetic stripe communication device 40. Reader environment sensor 20 functions as a simple on/off switch that is triggered when magnetic reader head 100 passes over it.

Although electronic card 1 can function without use of sensors 20, they are included in an especially preferred embodiment because they help to prolong the life of battery 60. Because electronic card 1 uses a magnetic stripe communication device 40, magnetic stripe communication device 40 will consume energy from battery 60 when it is in an active mode. When a user activates electronic card 1 by turning it on through on/off button 64, electronic card 1 will be consuming energy from battery 60. However, through use of sensors 20, magnetic stripe communication device 40 will remain in a sleep mode and not be powered up into an active mode until one of sensors 20 is activated, thus minimizing power consumption by magnetic stripe communication device 40.

Speed detection is critical for MCU 51 of electronic card 1 to determine the rate of broadcast by magnetic stripe communication device 40. There are various ways of determining the speed of card 1 travelling across a reader head, such as a photo sensor. However, it is especially preferred that a capacitive sensor is used for speed detection because it offers the advantages of a very low profile, relatively low cost and relatively low power consumption.

Each speed sensor 30 is located such that it will be triggered by magnetic reader head 100 after it has activated a sensor 20 and before magnetic reader head 100 passes over that portion of magnetic stripe communication device 40 that conveys a broadcast signal to magnetic reader head 100 during a swipe of electronic card 1.

Figure 9:
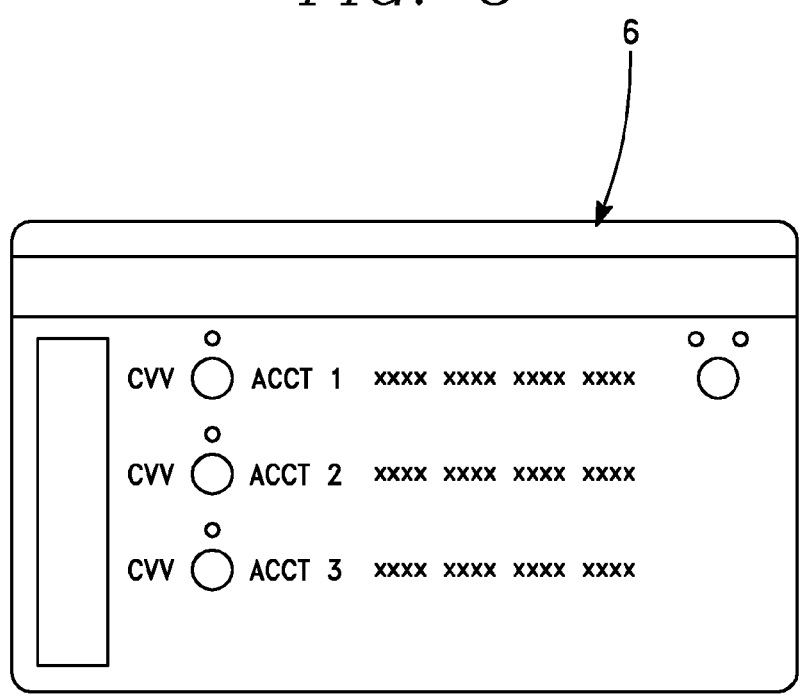
FIG. 9 depicts the back side of an electronic card suitable for use in accordance with the present invention with a back cover in place.
Figure 11:
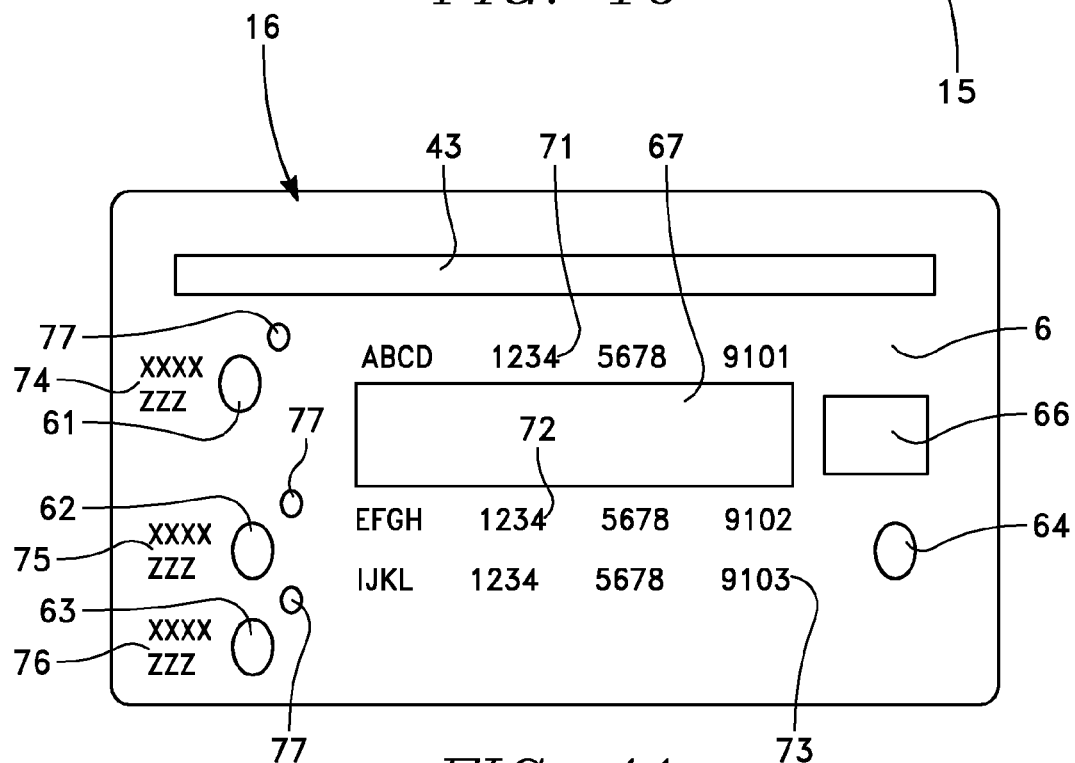
FIG. 11 depicts an alternative arrangement of a back side of an electronic smart card suitable for use in accordance with the present invention with a back cover in place.

While the invention has been described herein with reference to certain preferred embodiments, those embodiments have been presented by way of example only, and not to limit the scope of the invention. Additional embodiments thereof will be obvious to those skilled in the art having the benefit of this detailed description. For example, the present disclosure and FIGS. 9 and 11 illustrate an electronic card having three different visible account numbers, whereas additional account numbers could be added. Also, a visual flexible display device could be added for displaying the account chosen by a user. Further modifications are also possible in alternative embodiments without departing from the inventive concept.

Accordingly, it will be apparent to those skilled in the art that still further changes and modifications in the actual concepts described herein can readily be made without departing from the spirit and scope of the disclosed inventions as defined by the following claims.

What is claimed is:

1. An apparatus, comprising:
   a card body;
   a magnetic stripe communication device carried by the card body, said magnetic stripe communication comprising:
   a horizontal magnetic field generator comprised of a solenoid coil;
   a vertical magnetic field generator comprised of an orthogonal coil; and
   means for selective activation of either the horizontal magnetic field generator or the vertical magnetic field generator to transmit data to a magnetic reader to emulate a magnetic stripe card function depending upon a characteristic of the magnetic reader as detected by sensing system.

2. The apparatus of claim 1, further comprising:
   a computer carried by the card body;
   a computer-readable memory accessible by the computer; and
   a transmission algorithm residing in the computer-readable medium;
   wherein said transmission algorithm controls the rate of transmission of data by the magnetic stripe communication device to the magnetic reader.

3. The apparatus of claim 2 wherein the means for selective activation is comprised of the transmission algorithm.

4. The apparatus of claim 2 wherein the computer-readable memory is contained in the computer.

5. The apparatus of claim 2 wherein the computer-readable memory is contained apart from the computer.

6. The apparatus of claim 1 wherein the solenoid coil and the orthogonal coil are fused together as a single transducer.

7. The apparatus of claim 1 wherein the solenoid coil is used when the magnetic reader uses a read head with a c-core ferromagnetic read head and the orthogonal coil is used when the magnetic reader uses a vertically wound read head.

8. The apparatus of claim 1 wherein the horizontal magnetic field generator is used when the magnetic reader uses a horizontal field read head and the vertical magnetic field generator is used when the magnetic reader uses a vertical field read head.

9. The apparatus of claim 8 wherein the horizontal field read head is comprised of a c-core ferromagnetic read head and the vertical field read head is comprised of a vertically wound read head.

10. A method, comprising:
detecting whether a magnetic reader used during a card transaction between an electronic card and a magnetic reader uses a horizontal field read head or a vertical field read head; and
emulating a magnetic stripe card function by either using a horizontal magnetic field generator if the horizontal field read is detected or by using a vertical magnetic field generator if the vertical field read head is detected;
wherein the horizontal magnetic field generator is used when the magnetic reader uses a read head with a c-core ferromagnetic read head and the vertical magnetic field generator is used when the magnetic reader uses a vertically wound read head.

11. The method of claim 10 wherein the horizontal magnetic field generator is comprised of a solenoid coil and the vertical magnetic field generator is comprised of an orthogonal coil.

12. An apparatus, comprising:
a card body;
a magnetic stripe communication device carried by the card body, said magnetic stripe communication comprising:
a horizontal magnetic field generator comprised of a solenoid coil;
a vertical magnetic field generator comprised of an orthogonal coil;
a non-secure processor carried by the card body for controlling the magnetic stripe communication device; and
at least one sensor for detecting a characteristic of a magnetic reader;
wherein the non-secure processor activates either the horizontal magnetic field generator or the vertical magnetic field generator to transmit data to the magnetic reader to emulate a magnetic stripe card function depending upon the characteristic of the magnetic reader detected by the at least one sensor.

13. The apparatus of claim 12 wherein the solenoid coil and the orthogonal coil are fused together as a single transducer.

14. The apparatus of claim 12 wherein the solenoid coil is used when the magnetic reader uses a read head with a c-core ferromagnetic read head and the orthogonal coil is used when the magnetic reader uses a vertically wound read head.

15. The apparatus of claim 12 wherein the horizontal magnetic field generator is used when the magnetic reader uses a horizontal field read head and the vertical magnetic field generator is used when the magnetic reader uses a vertical field read head.

* * * * *